United States Patent [19]

Arthur

[11] 4,340,795
[45] Jul. 20, 1982

[54] PANEL MOUNT ADAPTER FOR SWITCHES

[75] Inventor: Ronald H. Arthur, Lauderhill, Fla.

[73] Assignee: AMF Incorporated, White Plains, N.Y.

[21] Appl. No.: 173,318

[22] Filed: Jul. 29, 1980

[51] Int. Cl.³ ............................................. H01H 9/00
[52] U.S. Cl. ................................. 200/295; 200/296; 245/27.3
[58] Field of Search ............... 200/292, 295, 296; 174/54–57, 66, 138 G, 153 G; 248/27.1, 27.3

[56] References Cited

U.S. PATENT DOCUMENTS

| | | | |
|---|---|---|---|
| 3,213,189 | 10/1965 | Mitchell et al. | 200/295 |
| 3,433,916 | 3/1969 | Chirota et al. | 200/292 |
| 3,501,599 | 3/1970 | Horecky | 200/295 |
| 3,800,113 | 3/1974 | Sheahan | 248/27.1 |
| 4,137,602 | 2/1979 | Klump, Jr. | 174/153 G |
| 4,211,905 | 7/1980 | Quigley | 248/27.3 |
| 4,241,972 | 12/1980 | Ayer | 248/27.3 |

Primary Examiner—Stephen Marcus
Attorney, Agent, or Firm—David E. Dougherty; Lawrence Hager

[57] ABSTRACT

The invention relates to an adapter for permitting a snap-in insertion of a small slide switch into an aperture in a mounting panel. The adaptor is a molded plastic member comprised of a rectangular frame having downwardly extending legs at each corner. Each leg has two outwardly and upwardly extending arms at each side of the leg. The free ends of the first arms at each end of the aperture are resilient and capture a tab on a metal housing of the slide switch thereby releasably holding the switch to the adapter. The free ends of the second arms at each end of the aperture face the periphery of the aperture and snap under the edge of the aperture to hold the plastic adapter in the frame.

3 Claims, 3 Drawing Figures

PANEL MOUNT ADAPTER FOR SWITCHES

BACKGROUND OF THE INVENTION

In electrical apparatus such as household appliances, material saving and labor saving features are attractive to the manufacturer. Similarly, features that simplify and minimize the cost and effort of repair are attractive. The present invention facilitates the insertion and retention of an electrical switch on the housing of an electrical apparatus. In the past it was common to secure an electrical switch to the housing by means of screws, rivets, or brackets that were located within the housing. The use of these types of fastening means all involved time consuming labor in the manufacture of the apparatus and in its repair, and in the replacement of the electrical switch.

One attempt to overcome the above shortcomings is disclosed in U.S. Pat. No. 4,211,905 issued July 8, 1980 to T. Quigley. That patent discloses a switch holder that is comprised of a face plate which is mounted in an aperture in a panel, or appliance housing, for example. The plate has four resilient legs that extend downwardly from the plate and through the aperture. A pair of such legs is located at each end of the face plate and each leg is located inwardly of the periphery of the plate. Each leg has a reverse bend therein and a shoulder in the downwardly extending portion. In use, each shoulder in a leg holds the bottom of the switch housing against the bottom surface of the face plate and the end of each leg on the upwardly bent portion releasably holds the face plate to the periphery of the aperture in the panel or appliance housing.

The present invention is an improvement over the panel mounting adapter disclosed in the above-mentioned patent. In particular, the adapter of this invention provides a more secure retention of the switch in the adapter. This more secure and reliable retention enables a switch manufacturer to assemble the switches onto the adapters and ship them in bulk to an appliance manufacturer with assurance that they will not become disassembled during shipment and handling. This is an attractive feature to the manufacturer since no additional subassembly will be required.

BRIEF DESCRIPTION OF THE DRAWINGS

This invention will be described in connection with the accompanying drawings wherein.

DETAILED DESCRIPTION OF PREFERRED EMBODIMENT

Figure 1:
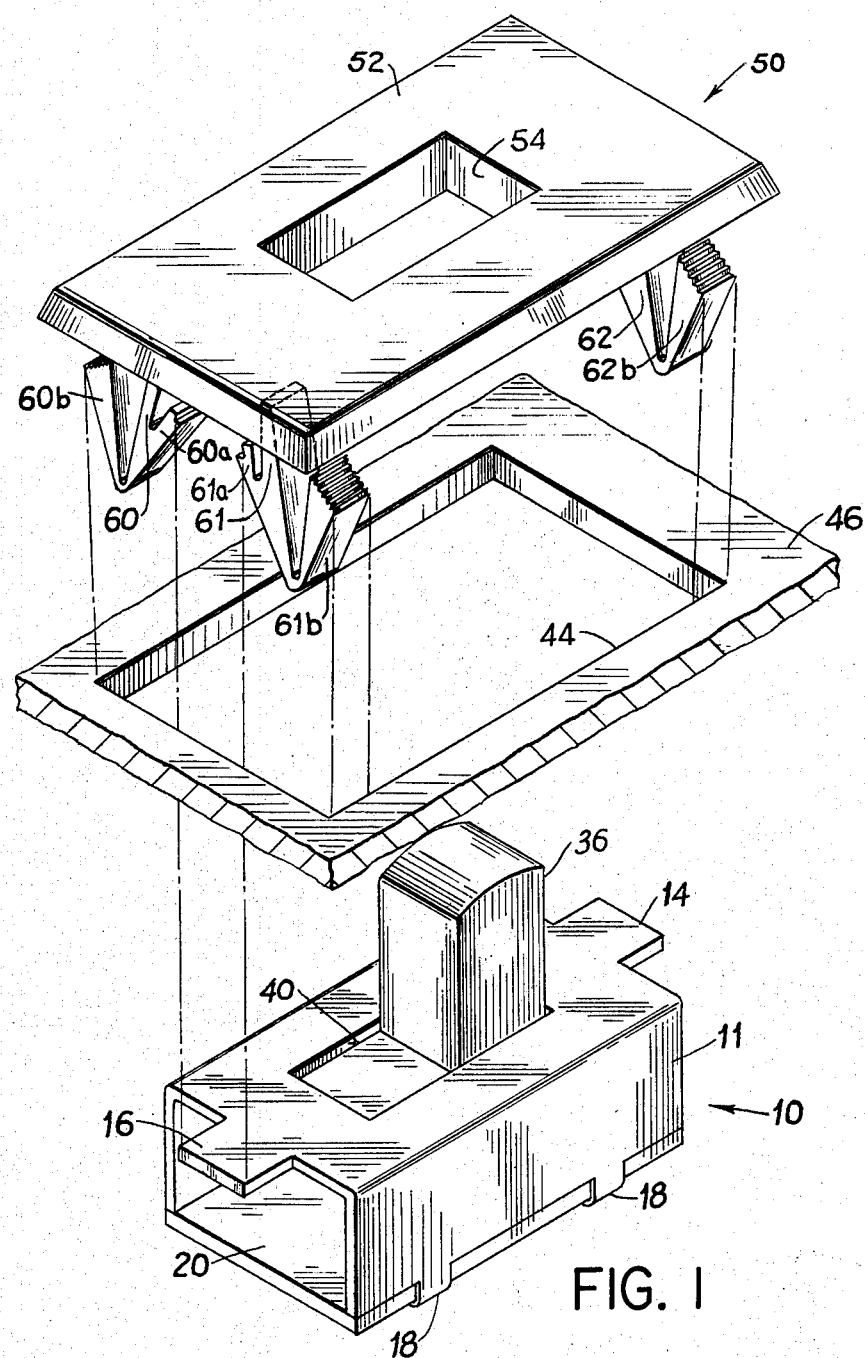
FIG. 1 is an exploded view showing the panel mounting switch adapter of this invention and its relationship to the switch it receives and to the panel aperture into which it is inserted.

Referring to the drawings, the electrical switch 10 is a common type of slide switch having a metal housing 11 with tabs 14 and 16 that extend outwardly beyond the opposite ends of the switches. The bottom edges of housing 11 has tabs 18 that are bent under to hold an insulating terminal board 20. Terminal board 20 has a plurality of electrical terminals 22, FIG. 2, extending therethrough to permit electrical connections to respective stationary contacts 24 that are on the inner surface of the terminal board. A slider member 30 is located between housing 11 and terminal board 20 and is translatable back within the housing and above the stationary contacts. Slider member 30 supports one or more movable contacts 32 which bridge two or more of the stationary contacts 24 when the slider is selectively moved to one of its possible positions, as is common in slide switches of this type. A switch operator or handle 36 extends through an elongated slot 40 in housing 11 and provides means for moving slider 30 and movable contacts 32.

Figure 2:
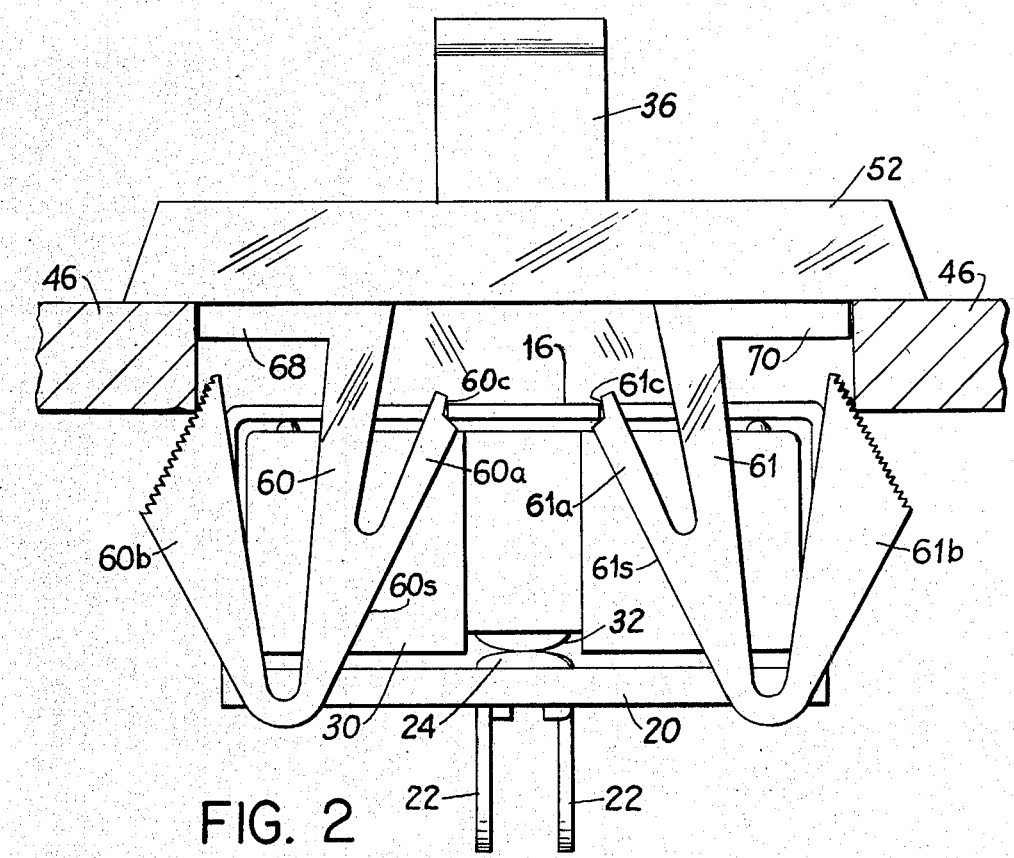
FIG. 2 is an end view of the assembled members that are shown in the exploded view of FIG. 1.
Figure 3:
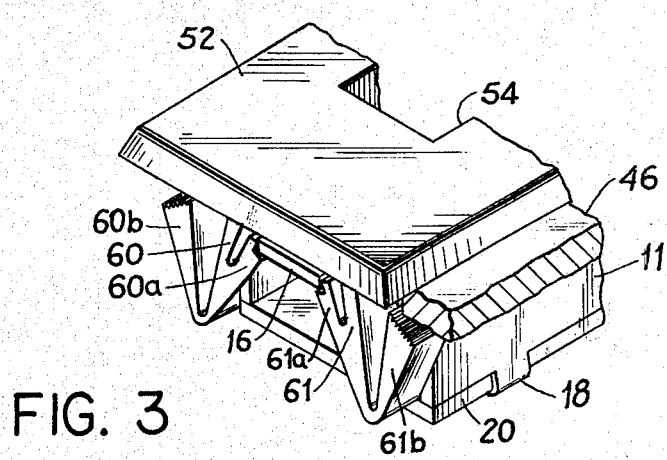
FIG. 3 is a partial view of the end of the adapter of this invention showing how tabs on the switch housing are releasably retained between a pair of arms on the adapter.

Switch 11 is releasably secured within an aperture 44 of a mounting panel 46 by means of the adapter 50 of this invention. Adapter 50 may be a molded plastic member and is comprised of a rectangularly shaped frame member 52 whose periphery extends beyond the periphery of aperture 44 in mounting panel 46. Frame 52 has a rectangularly shaped opening 54 extending completely through its center region. Opening 54 is adapted to be positioned in registration with aperture 44 in panel 46 and with slot 40 in switch housing 11. When assembled, switch operator 36 of switch 10 extends through aperture 44 and opening 54 and is accessable from the outside of the assembly, as illustrated in FIG. 2.

At the four corners of frame member 52, and spaced inwardly from the periphery thereof, are four legs 60, 61, 62, and 63 (not illustrated). Each leg extends downwardly from the bottom surface of frame member 52 and is adapted to pass through aperture 44 in mounting panel 46. As best seen in FIG. 2, each of the legs has a first arm, designated by the subscript "a", that extends upwardly and inwardly from its respective legs 60, 61, 62 and 63, and a second arm, designated by the subscript "b", that extends upwardly and outwardly from the bottom portion of its respective leg.

The free end of each of the first legs 60a, 61a, 62a, and 63a has a notch therein, designated by the subscript "c", that is arranged and shaped to releasably engage the edge of a corresponding tab on the end of switch housing 11. Before assembly of the switch 10 into adapter 50, the spacing between the free ends of a pair of first arms at one end of the adapter 60a and 60b of FIG. 2 for example, is less than the width of tab 16 that is to be held between those free ends. In assemblying switch 10 into adapter 50, the edges of tab 16 are pushed up the inside inclined surfaces 60s and 61s of arms 60 and 61 and cause these yieldable arms 60 and 61 to bend sufficiently to allow the edges of the tab to enter the notches 60c and 61c, as illustrated in FIG. 2. Yieldable arms 60a and 61a still are bent inwardly toward their respective legs 60 and 61 so that they exert a spring force against the edges of the tab to keep it seated, or captured, within the notches 60c and 61c. Tab 16 may be released by bending one or both of the first arms 60a, 61a toward its respective leg 60, 61 to free one or both edges of the tab. Switch 10 then may be withdrawn from adapter 50.

The second arms 60b, 61b, 62b, and 63b (not illustrated) extend upwardly on the opposite sides of the respective legs from the first arms. Their free ends are serrated or notched and are positioned to engage the periphery of aperture 44 in mounting panel 46 when the legs 60, 61, 62 and 63 are pushed down through aperture 44. The bottom edges of mounting panel 46 at the aperture boundry may engage anywhere along the serrated surfaces of the second arms 60b, 61b, 62b, and 63b. Also, desirably the serrated surfaces will engage the mounting panel 46 at the corners of aperture 44, thereby securely positioning the adapter in the aperture. As illustrated in FIG. 2, the periphery of frame member 52 extends beyond the edges of the aperture. Also as illustrated, positioning guides 68 and 70 may be molded on the bottom surface of frame member 52 to aid in securely positioning the frame member relative to the edges of the aperture.

To remove mounting adapter 50 from aperture 44 in mounting panel 46, the second arms 60b, 61b, 62b, and 63b are pushed inwardly toward their respective legs so that the serrated free ends clear the edges of aperture 44. Panel 50 then may be withdrawn from the aperture.

From the above description it may be seen that the adapter 50 is simple in construction and use and securely holds the switch 10 in mounting panel 46. Also, the switch and adapter remain together during shipment in bulk quantities from the switch manufacturer to a systems manufacturer, for example. The legs 60–63 need not be long so that they take little space behind mounting panel 46.

It is to be understood that a preferred embodiment has been illustrated and described, and that alterations may be made in accordance with the teachings of this disclosure and still be within the scope of the claims. For example, frame member 52, opening 54 and aperture 44 may have shapes other than rectangular. Additionally, switch 10 may be some type other than a slide switch, i.e., a rocker switch or a push switch. Furthermore, panel member 46 may be a printed circuit board rather than an appliance housing. And, arms 60b–63b may face in directions other than as illustrated.

I claim:

1. An adapter for mounting an electrical component in an aperture in a mounting panel or the like, said component having a tab that extends outwardly from its housing, said adapter comprising:
    a frame member having an outer periphery that extends, at least partially, beyond the edge of an aperture into which the component is to be mounted,
    an opening extending transversely through the interior portion of the frame member and adapted to register with the aperture in said mounting panel,
    at least two spaced apart legs extending downwardly from a bottom surface of said frame and adapted to be inserted through said aperture in the mounting panel when the adapter is mounted on the panel,
    each leg having two resilient arms, one extending outwardly toward the edge of said aperture when the leg is inserted therethrough and the other arm extending in a different direction,
    said other arms of the two legs being spaced apart a distance to releasably clamp with opposing resilient bias said tab on the component housing therebetween when the component is inserted through the opening, thereby releasably holding the component to the frame member,
    said one arms on the downwardly extending legs being constructed to engage the edge region of the aperture in the mounting panel to releasably hold the adapter in said aperture.

2. An adapter for mounting an electrical switch in an aperture in a mounting panel or the like, said switch having a housing and at least one tab extending outwardly from a side thereof, said switch also having an operating member extending upwardly from the top surface thereof, said adapter comprising
    a frame member having an outer periphery that extends beyond the edge of an aperture into which the component is to be mounted and having a bottom surface that is to be on or adjacent said panel when the adapter is mounted in said aperture,
    an opening extending transversely through the interior portion of the frame member and adapted to register with the aperture in said mounting panel,
    a plurality of legs extending downwardly from the bottom surface of the frame member at spaced locations between the periphery and opening,
    each leg having two resilient arms with free ends that extend upwardly toward the bottom surface of the frame member,
    a first arm on each leg being positioned on one side of the leg and facing the periphery of the frame member and the second arm facing in a different direction,
    the second arms of adjacent legs being positioned and arranged to releasably clamp with opposing resilient bias the tab of said switch therebetween when the switch is positioned adjacent the bottom surface of the frame member with the switch operating member extending through the opening of the frame member,
    the first arms being adapted to releasably engage the edge region of the aperture in said panel when the adapter is inserted into said aperture with its bottom surface adjacent the panel.

3. An adapter for mounting an electrical switch in an aperture in a mounting panel or the like, said switch including a rectangularly shaped housing with an operating member extending therethrough and with two rigid tabs extending from the top surface of the housing at opposite ends thereof, said switch adapter comprising
    a rectangularly shaped frame member that has a rectangularly shaped opening extending transversely through the interior portion of the frame, said opening being adapted to register with the aperture in the mounting panel,
    two pairs of legs extending downwardly from the bottom surface of the frame member at opposite end regions thereof,
    each leg having two resilient arms that extend upwardly toward the bottom surface of the frame member,
    a first arm on each leg being positioned on one side of the leg and facing the periphery of the frame member and the second arm being on the opposite side of the leg and facing in the direction opposite the first arm,
    the second arms of each pair of legs facing each other and their ends being arranged to releasably clamp with opposing inwardly directed bias a tab of said switch therebetween when the switch is positioned adjacent the bottom surface of the frame member with the operating member extending through the opening of the frame member,
    said first arms having inclined surfaces at their end regions that are adapted to releasably engage with opposing outwardly directed bias the edge region of the aperture in the panel when the adapter is inserted into the aperture with the bottom surface of the adapter being adjacent the panel.

* * * * *